United States Patent
Slipchenko et al.

(10) Patent No.: US 7,583,366 B2
(45) Date of Patent: Sep. 1, 2009

(54) LASER RANGE FINDER

(75) Inventors: Nikolai N. Slipchenko, Ul. Krupskoi 13-72, Moscow (RU) 119331; Mikhail I. Krymsky, Moscow (RU)

(73) Assignee: Nikolai N. Slipchenko, Moscow (RU)

( * ) Notice: Subject to any disclaimer, the term of this patent is extended or adjusted under 35 U.S.C. 154(b) by 0 days.

(21) Appl. No.: 11/937,694

(22) Filed: Nov. 9, 2007

(65) Prior Publication Data
US 2008/0285009 A1 Nov. 20, 2008

(30) Foreign Application Priority Data
Nov. 9, 2006 (RU) .............................. 2006139526

(51) Int. Cl.
*G01C 3/08* (2006.01)
(52) U.S. Cl. .................................................. 356/5.01
(58) Field of Classification Search .......... 356/3.01–22, 356/28, 28.5, 128, 128.5
See application file for complete search history.

(56) References Cited

U.S. PATENT DOCUMENTS

2004/0135992 A1* 7/2004 Munro ....................... 356/4.01

OTHER PUBLICATIONS

Molebny, V. V., "Systems for optical detection and ranging," Mashinostroenie, Moscow, 1981, pp. 52-57.

* cited by examiner

*Primary Examiner*—Thomas H Tarcza
*Assistant Examiner*—Luke D Ratcliffe
(74) *Attorney, Agent, or Firm*—Houston Eliseeva LLP

(57) ABSTRACT

This invention is a distance measurement rangefinder. The proposed laser rangefinder contains, serially connected, pulse laser with an optical system, a pulse amplifier and a regulated pulse generator; also, serially connected, a photoreceiver based on an avalanche photodiode with an optical system, conjugate to that of the laser, an amplifier of photo-detected signals, comparator, time-interval meter, and an object detection indicator. This rangefinder is unique in that the pulse amplifier features an additional output, connected to which is a second laser with an optical system, conjugate to that of the first laser and avalanche photodiode; and an additional second input connected to the first input of the pulse amplifier, to the first output of the regulated pulse generator and to the first input of the time-interval meter.

2 Claims, 3 Drawing Sheets

LASER RANGE FINDER

RELATED APPLICATIONS

This application claims priority to Russian Patent Application No. RU 2006139526 filed on Nov. 9, 2006, which is incorporated herein by reference in its entirety.

BACKGROUND OF THE INVENTION

This invention relates to instruments for distance measurement, such as rangefinders.

Presently, an array of laser rangefinders of different applications is known. An example of one such rangefinder is described in "Systems for optical detection and ranging" by V. V. Molebny (*Mashinostroenie*, Moscow, 1981, p. 52); and is used to determine distance to an object with range discrimination. It utilizes a pulse laser with an optical collimation system emitting short optical pulses toward the object; exiting start reference pulse is diverted toward a photoreceiver with pulse amplification, which is connected to a start pulse of the time interval counter. The altered time interval, in either analog or digital form, reflects measured distance to the object.

Disadvantages of such laser rangefinder include inability to discriminate object by distance or field of view; e.g., of the field of view contains several objects, or a specular object, or a continuous object, it is not possible to select an object by its angular or reflective characteristics.

Above disadvantages are partly overcome by a pulse rangefinder (Ibid, p. 55, FIG. 2.6), a prototype of this invention.

Above rangefinder contains (connected serially) a pulse laser with an optical system, a pulse amplifier and a regulated pulse generator; also, serially connected, photoreceiver based on avalanche photodiode with an optical system (conjugate with that of the laser), an amplifier of photo detected signals, comparator, time-interval meter, and an object detection indicator. Information about distance to object is stored in a memory module from which information pertaining to a specific object can be retrieved by a reader device.

The objective was the construction of a compact laser rangefinder for detection of concealed surveillance on surveillance optical equipment (spyglasses, periscopes, binoculars, cameras, et cetera). The visual discrimination of above-mentioned objects against the background objects (walls, buildings, trees, grass, et cetera) was required both by reflective characteristics (quasi-cat's eye objects against diffuse objects) and by angular characteristics (specular objects against continuous objects).

To achieve this objective following is proposed: a laser rangefinder containing, serially connected, pulse laser with an optical system, a pulse amplifier and a regulated pulse generator; also, serially connected, a photoreceiver based on an avalanche photodiode with an optical system (conjugate to that of the laser), an amplifier of photo detected signals, comparator, time-interval meter, and an object detection indicator. Unique characteristics of the proposed rangefinder are: an additional output of the pulse amplifier, to which second laser with an optical system (conjugate to that of the first laser and avalanche photodiode) are connected; and a second input, which is connected to the first input of the pulse amplifier, first output of the regulated pulse generator and first input of the time-interval meter. Unique additions also include:

a synchronizer with its first output connected to the third input of the pulse amplifier, its third output connector to the third input of the first comparator, and its input connected to the second output of the regulated pulse generator;

a second comparator with its first input connected to the output of the amplifier of photo detected signals as well as to the first input of the first comparator, and its second input connected to the second output of the synchronizer;

first and second integrators with their inputs connected to the output of the second comparator;

a third integrator with its input connected to the second output of the synchronizer;

a summation counter with its first input connected to the output of the first integrator, its second input connected to the output of the second integrator, its third input connected to the output of the third integrator, and summation counter's output connected to the second input of the first comparator;

an avalanche photodiode power regulator with its first output connected to the second input of the summation counter and its output connected to the avalanche photodiode;

a regulated counter, installed in the interface of the first comparator and object detection indicator with the counter's first input connected to both output of the first comparator and to the second input of the time-interval meter, its second input connected to the fourth output of the synchronizer, and its first output connected to both the input of the object detection indicator and input of an additional "inhibit pulse" generator;

a strobe generator with its input connected to the second output of the regulated counter and its output connected to the input of the regulated pulse generator;

the output of the "inhibit pulse" generator is connected to the third input of the time-interval meter, while the output of the time-interval meter is connected to the fourth input of the pump pulse amplifier.

Additionally, we propose to equip this laser rangefinder with a speech synthesizer installed on the interface between time-interval meter and pump pulse amplifier. The synthesizer's first input is then connected to the output of the time-interval meter, its second input—to the output of the "inhibit pulse" generator, and the synthesizer's output is connected to the fourth input of the pump pulse amplifier.

As a result of the modifications described above discrimination of the objects measured is increased. Introduction of three ways of regulation allows for adaptation of the detection threshold by (1) gradually changing factors—temperature and gradual background changes (daylight, night time, clouds, et cetera); (2) by rapidly changing factors (background change light/dark, building, shadow, random extraneous light source in the field of view during rapid scan), (3) by distance to object in order to decrease amplitude-temporal error due to distance change and space-time amplitude of discrimination of target objects (optical systems) from the extraneous objects (diffuse-reflective).

Utilization of the speech synthesizer would allow the operator to receive distance information without interruption of the search and observation process; this increases reliability and efficiency of information detection and recording. Employment of the object detection indicator allows rapid fixing the rangefinder's field of view on the object.

The dual pumping mode allows for better concealment and decreases the threshold of detection by night-vision gear. Utilization of two emission channels with separated emission diagrams allows for discrimination of target specular objects (optical systems) from diffuse objects (diffuse reflective walls, building windows, road signs, et cetera) by their angle and linear dimensions criteria.

The above and other features of the invention including various novel details of construction and combinations of parts, and other advantages, will now be more particularly described with reference to the accompanying drawings and pointed out in the claims. It will be understood that the particular method and device embodying the invention are shown by way of illustration and not as a limitation of the invention. The principles and features of this invention may be employed in various and numerous embodiments without departing from the scope of the invention.

BRIEF DESCRIPTION OF THE DRAWINGS

In the accompanying drawings, reference characters refer to the same parts throughout the different views. The drawings are not necessarily to scale; emphasis has instead been placed upon illustrating the principles of the invention. Of the drawings.

DETAILED DESCRIPTION OF THE PREFERRED EMBODIMENTS

Figure 1:
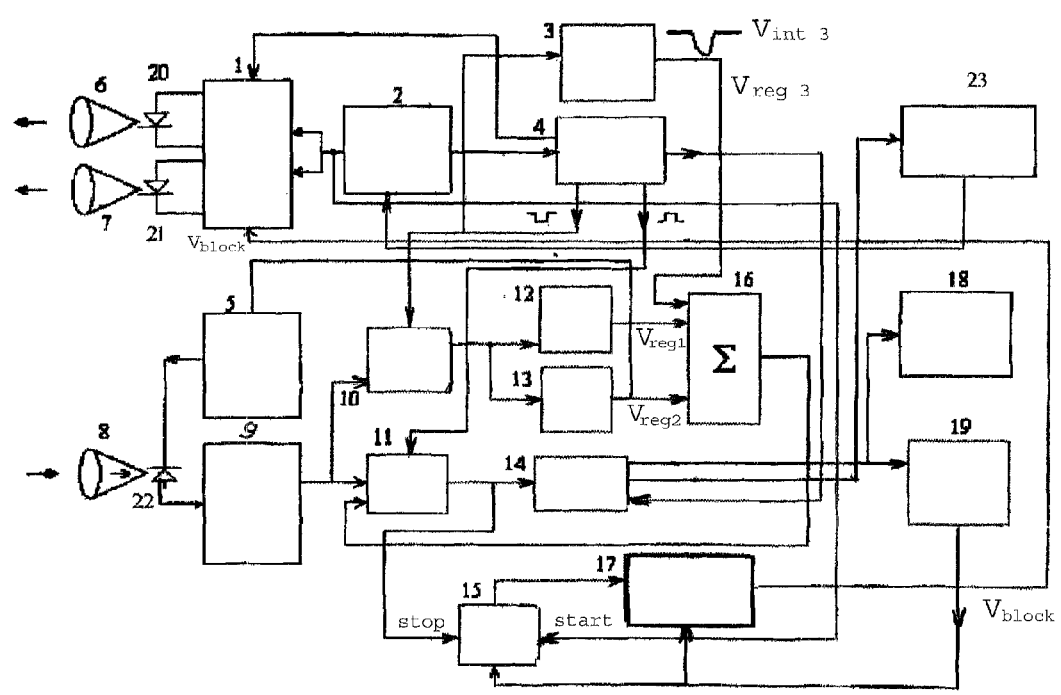
FIG. 1 presents a schematic of proposed rangefinder
Figure 2:
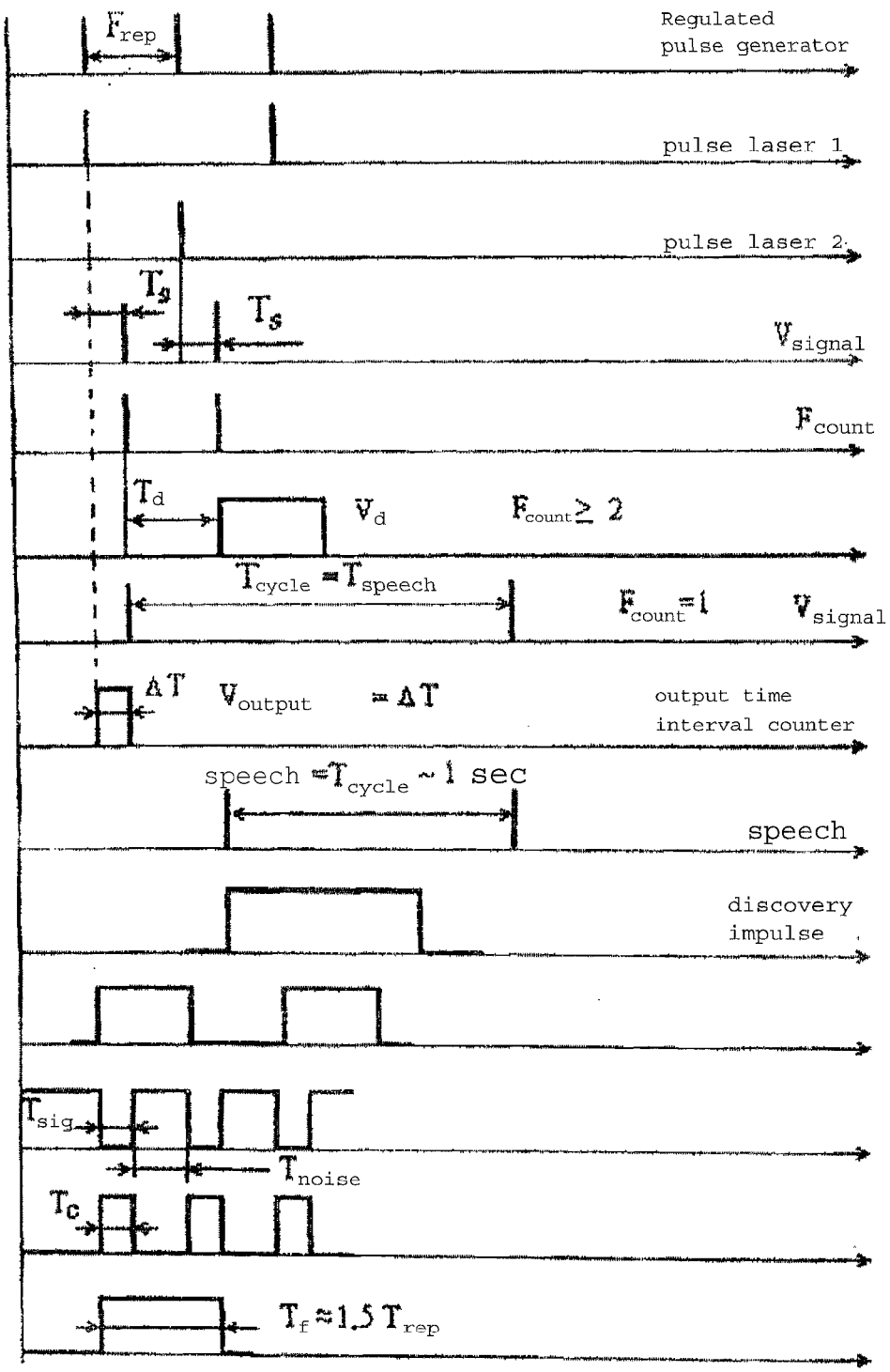
FIG. 2 presents a diagram of signals and operation principles of the rangefinder
Figure 3:
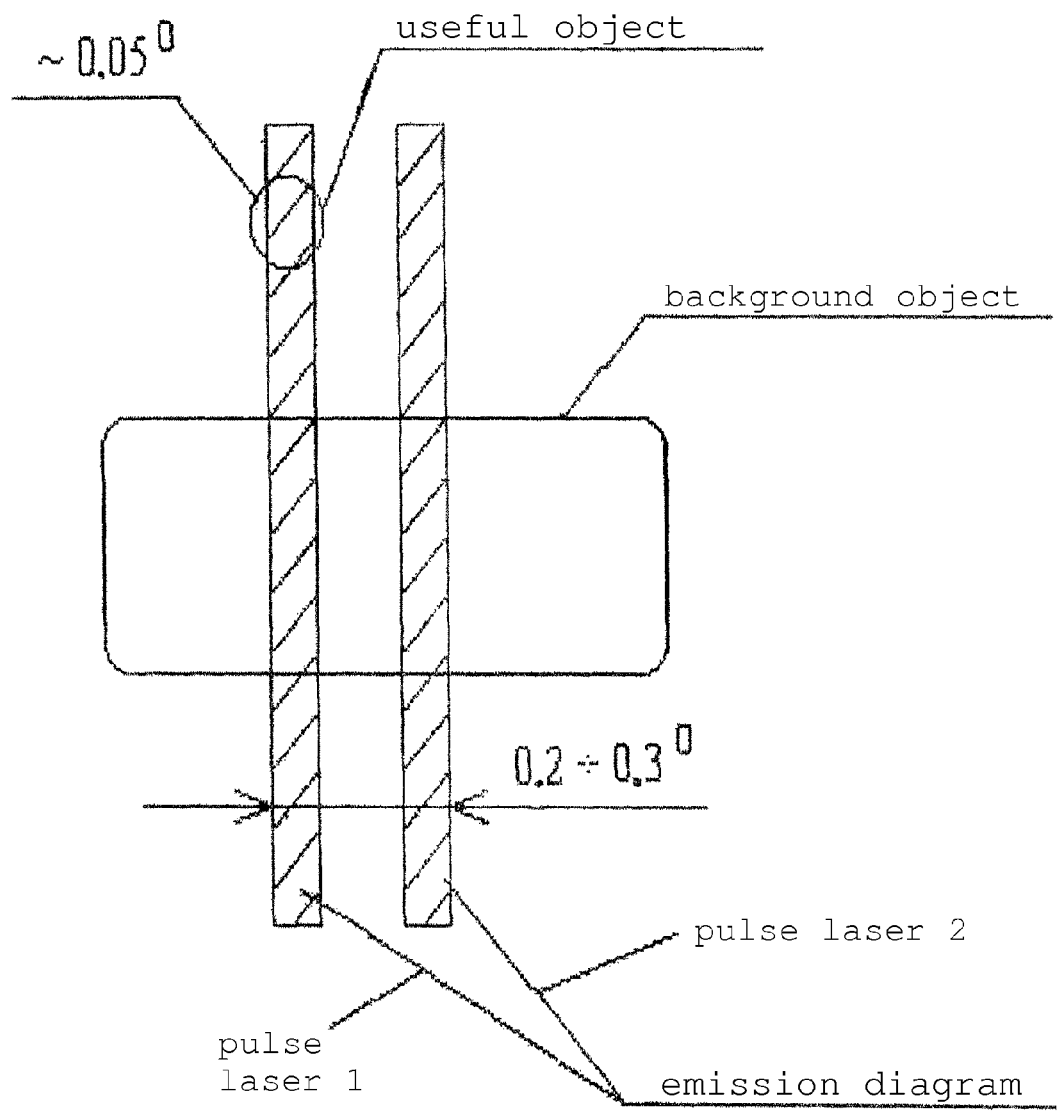
FIG. 3 presents emission diagram of separated channels: (1)—pump pulse amplifier; (2) regulated pulse generator; (3)—third integrator; (4)—avalanche photodiode power regulator; (6) and (7)—collimating optical lenses; (8)—optical receiving lens, (9)—amplifier of photo-detected signals; (10)—second comparator; (11)—first comparator; (12)—first integrator; (13)—second integrator; (14)—regulated counter; (15) time-interval meter; (16)—summation counter; (17)—speech synthesizer; (18) object detection indicator; (19) "inhibit pulse" generator; (20)—first pulse laser, (21)—second pulse laser; (22) avalanche photodiode.

The dual-channel commutated pulse amplifier (1) has four inputs, two of which (strobe and base) are connected to one of four synchronizer (4) outputs and to the speech synthesizer (17) output, respectively. The remaining two inputs, together with one of the three time-interval meter (15) outputs, are connected to one of the two outputs of the regulated pulse generator (2). The first (20) and second (21) pulse lasers are connected to two outputs of the pulse amplifier (1). The second output of the of the regulated pulse generator (2) if connected to the synchronizer (4) input. Input of the regulated pulse generator (2) is connected to the output of the strobe generator (23); the input of the strobe generator (23) is connected to one of two outputs of the regulated counter (14). Second synchronizer (4) output is connected to one of three inputs (strobe input) of the second comparator (10) and concurrently to the input of the third integrator (3). Third synchronizer (4) output is connected to the one of three inputs (strobe input) of the first comparator (11). Fourth synchronizer (4) output is connected to one of two inputs (strobe input) of the regulated counter (14). Second input of the second comparator (10) is connected concurrently to the second input of first comparator (11) and to the output of the amplifier of photo-detected signals (9). Third input (base) of the second comparator (10) is intended for reception of signal according to a set detection threshold. Third input (base) of the first comparator (11) is connected to the summation counter (16) output. Output of the second comparator (10) is connected concurrently to input of integrators (12) and (13). Output of integrator (12) is connected to one of three inputs of summation counter (16). Third summation counter (16) input is connected to the output of integrator (3) and the second summation counter (16) input is connected concurrently to the output of the second integrator (13) and to one of two outputs of the avalanche photodiode power regulator (5). The second regulator (5) output is connected to the avalanche photodiode, which, in turn, is connected to the input of the amplifier of photo-detected signals (9). Output of the first comparator (11) is connected concurrently to the second input of the regulated counter (14) and to the second input of the time-interval meter (15). Second output of the regulated counter (14) is connected concurrently to the input of "inhibit pulse" generator (19) and to the input of object detection indicator (18). Output of "inhibit pulse" generator (19) is connected concurrently to the third input of time-interval meter (15) and to one of two inputs of the speech synthesizer (17). Second input of speech synthesizer (17) is connected to the output of the time-interval meter (15).

Laser rangefinder operates as follows:

Regulated pulse generator (2) generates a sequence of short pulses $T_{(pulse)} \sim 100$ nsec with repetition frequency $F_{(repetition)} \sim 100$ Hz-1 KHz (sufficient for survey); pulses activate lasers (20) and (21) through the pulse amplifier (1), alternating between lasers (20) and (21). Laser emission hits the object though collimating lenses (6) and (7). Receiving lens (8) receives the signal reflected off the object; the signal then passes onto the photoreceiver—avalanche photodiode (22). Photo-detected signal is enhanced by the amplifier (9) and is passed onto the comparators (10) and (11). First comparator generates an information signal when detection threshold is passed; signal is tri-partite. Second comparator (10) generates regulation signals proportional to noise levels of the receiving channel:

$$V_{(noise)} = P_{(bground)} + V_{(AP\,power)} + V_{(amp\,noise)} \pm V_{(noise\,T^\circ\,C.)}$$

where:

$P_{(bground)}$—level of background noise $V_{(AP\,power)}$—level of avalanche photodiode (AP) regulator noise $V_{(amp\,noise)}$—level of pulse amplifier noise $V_{(noise\,T^\circ\,C.)}$—noise due to temperature The number of noise pulses resulting from the second comparator (10) is then modified by the integrators (12) and (13) into regulation signals with different time constant. Gradually-changing signal $V_{(reg\,2)}$ (with $\tau_2$) is relayed to the AP power regulator (5) which regulated the AP enhancement coefficient, thus, providing for consistency of noise level (detection threshold) in a wide range of conditions ($P_{(bground)} = 0\text{-}10^{-5}$ W, $T^\circ\,C. = -40\text{-}50^\circ$ C.).

The first signal $V_{(reg\,1)}$ is rapid (with $\tau_1 \ll \tau_2$) and is relayed though the summation counter (16) concurrently with $V_{(reg\,2)}$ to the base input of the first comparator (11). Also concurrently, a third signal $V_{(reg\,3)}$ is relayed from the third integrator (3) with $\tau_3\text{-}T_{(closerange)}$ ($T_{(closerange)} = 1\text{-}2$ microsec, close range zone ~50-300 m).

$V_{(reg\,3)}$ is an adaptive signal that incorporates detection threshold corrections depending on changes in distance signal. This requires elimination of diffuse object signals and isolation of optical system signals.

Tri-partite regulation resolves following issues:

$V_{(reg\,2)}$ allows adaptation of the detection threshold to gradually changing factors (temperature and gradual background changes, e.g. daytime, nighttime, clouds, et cetera).

$V_{(reg\ 1)}$ allows adaptation of detection threshold to rapid changes in conditions (light/dark background, building, shadow, extraneous light sources in the field of view during rapid scan).

$V_{(reg\ 3)}$ allows adaptation of detection threshold based on distance to object in order to decrease amplitude-temporal error due to distance change and space-time amplitude of discrimination of target objects (optical systems) from the extraneous objects (diffuse-reflective).

Optical systems produce a reflected signal (glare) at a level $$P_{(refl\ optical)} = P_{(diffuse)}(\theta_{(diffuse)}/\theta_{(optical)}) = P_{(diffuse)}(10^2 - 10^3)$$

far greater than that of the diffuse objects, where:

$$\theta_{(diffuse)} \cong 120° - 180° \sim (2-3)\text{rad.} \cong 0$$

$$\theta_{(optical)} \cong 1° - 5° \sim (0.017 - 0.1)\text{rad.}$$

For practical purposes, the following regulation rule is applicable:

$$V_{reg(t)} = V_0 \cdot \exp(I/\tau_3)$$

Due to described technical modifications such attributes as noise resistance as well as discrimination in detection and measurement of the objects parameters are improved.

For example, optical equipment have reflective aperture of ~20-50 mm while dimensions of walls, glass (windows), light-reflecting road signs are much greater. Therefore, two signals are received from the first laser as well as the second laser. The regulated counter (14) thus initiates a signal in the "inhibit pulse" generator (19), which inhibits information output. This inhibition is absent when only a single signal from the first laser is available.

While this invention has been particularly shown and described with references to preferred embodiments thereof, it will be understood by those skilled in the art that various changes in form and details may be made therein without departing from the scope of the invention encompassed by the appended claims.

What is claimed is:

1. A laser rangefinder comprising:

connected in series a pulse laser with an optical system, a pulse amplifier and a regulated pulse generator;

connected in series a photoreceiver based on an avalanche photodiode with an optical system conjugate to that of the pulse laser, an amplifier of photo-detected signals, a comparator, a time-interval meter, and an object detection indicator;

the pulse amplifier having an additional output to which a second laser with an optical system conjugate to that of the first laser and avalanche photodiode is connected, the pulse amplifier having a second input connected to the first input of the pulse amplifier, to the first output of the regulated pulse generator and to the first input of the time-interval meter;

a synchronizer with its first output connected to a third input of the pulse amplifier, the third output being connected to a third input of the first comparator, and its input connected to the second output of the regulated pulse generator;

a second comparator with its first input connected to the output of the amplifier of photo-detected signals and to the first input of the first comparator, and its second input connected to the second output of the synchronizer;

first and second integrators with their inputs connected to the output of the second comparator;

a third integrator with its input connected to the second output of the synchronizer;

a summation counter with its first input connected to the output of the first integrator, its second input connected to the output of the second integrator, its third input connected to the output of the third integrator, and summation counter's output connected to the second input of the first comparator;

an avalanche photodiode power regulator with its first output connected to the second input of the summation counter and its second output connected to the avalanche photodiode, a regulated counter, installed in the interface of the first comparator and object detection indicator with the first input of the regulated counter connected to both output of the first comparator and to the second input of the time-interval meter, its second input connected to the fourth output of the synchronizer, and its first output connected to both the input of the object detection indicator and input of an additional inhibit pulse generator;

a strobe generator with its input connected to the second output of the regulated counter and its output connected to the input of the regulated pulse generator;

the output of the inhibit pulse generator is connected to the third input of the time-interval meter, while the output of the time-interval meter is connected to the fourth input of the pump pulse amplifier.

2. The laser rangefinder according to claim 1, further comprising a speech synthesizer installed on the interface between time-interval meter and the pulse amplifier, wherein the synthesizer's first input is then connected to the output of the time-interval meter, its second input—to the output of the inhibit pulse generator, and the synthesizer's output is connected to the fourth input of the pulse amplifier.

* * * * *